United States Patent [19]

Watanabe

[11] Patent Number: 4,641,297
[45] Date of Patent: Feb. 3, 1987

[54] DEVICE FOR MOUNTING AN INFORMATION CARRYING DISC MEMBER

[75] Inventor: Masayoshi Watanabe, Toyokawa, Japan

[73] Assignee: Hitachi, Ltd., Tokyo, Japan

[21] Appl. No.: 608,163

[22] Filed: May 8, 1984

[30] Foreign Application Priority Data

May 9, 1983 [JP] Japan .................................. 58-79400

[51] Int. Cl.⁴ ............................................. G11B 17/04
[52] U.S. Cl. ................................................... 369/75.2
[58] Field of Search ............................. 369/75.1, 75.2

[56] References Cited

FOREIGN PATENT DOCUMENTS 56-58167  5/1981  Japan .................................. 369/75.2

Primary Examiner—Steven L. Stephan
Attorney, Agent, or Firm—Antonelli, Terry & Wands

[57] ABSTRACT

A conveying mechanism for conveying a movable base having an information carrying disc member loaded thereon, and a clamping mechanism for raising and lowering a clamper are controlled by the movement of the movable base made by the rotation of a single motor. The clamping mechanism is actuated after the movable base is conveyed or moved by a predetermined distance, whereby the clamper is automatically lowered.

3 Claims, 6 Drawing Figures

DEVICE FOR MOUNTING AN INFORMATION CARRYING DISC MEMBER

Field of the Invention

The present invention relates to a device for mounting an information carrying disc member such as, for example, a compact disc having a diameter of 12 cm and, more particularly, to a device for mounting an information carrying disc member which is suitable for conveying a movable base having an information carrying disc member placed thereon and is inexpensive.

BACKGROUND OF THE INVENTION

In recent years, a device for mounting an information carrying disc member, and arranged such that a movable base is moved from the interior of a case and an information carrying disc member is placed on the movable base, whereby mounting and dismounting of the disc member can be automatically effected by a mere depression of an OPEN and/or CLOSE button, has been widely adopted with an aim to simplify the mounting and dismounting of the disc member.

In this type of disc-member mounting device, however, drive motors are respectively separately provided for a conveying mechanism for the movable base having the disc member placed thereon and a clamping mechanism therefor, said drive motors being respectively controlled by, for example, a microcomputer. For this reason, it is necessary to provide a detecting means such as, for example, a conveyance-completion detecting switch so as to keep the clamping mechanism inoperative until, for example, conveyance of disc member is completed. Further, it is necessary to provide two drive motors one of which is used for moving the movable base and the other of which is used for clamping the member. These result in an increase in the manufacturing cost of the device.

SUMMARY OF THE INVENTION

In view of the above, the object of the present invention is to provide an inexpensive device for mounting an information carrying disc member which can eliminate the above-mentioned prior art drawbacks as well.

The characterizing feature of the present invention resides in the respect of controlling the conveying mechanism for a movable base and the clamping mechanism for raising and lowering a clamper, by the movement of a rack driven by a single motor, thereby automatically lowering the clamping mechanism after conveying the movable base by a predetermined distance.

BRIEF DESCRIPTION OF THE DRAWINGS

Other features, objects and advantages will become apparent from the descriptions which will be hereinafter made with reference to the appended drawings in which.

DETAILED DESCRIPTION

An embodiment of the present invention will now be described with reference to FIGS. 1 to 6.

Figure 1:
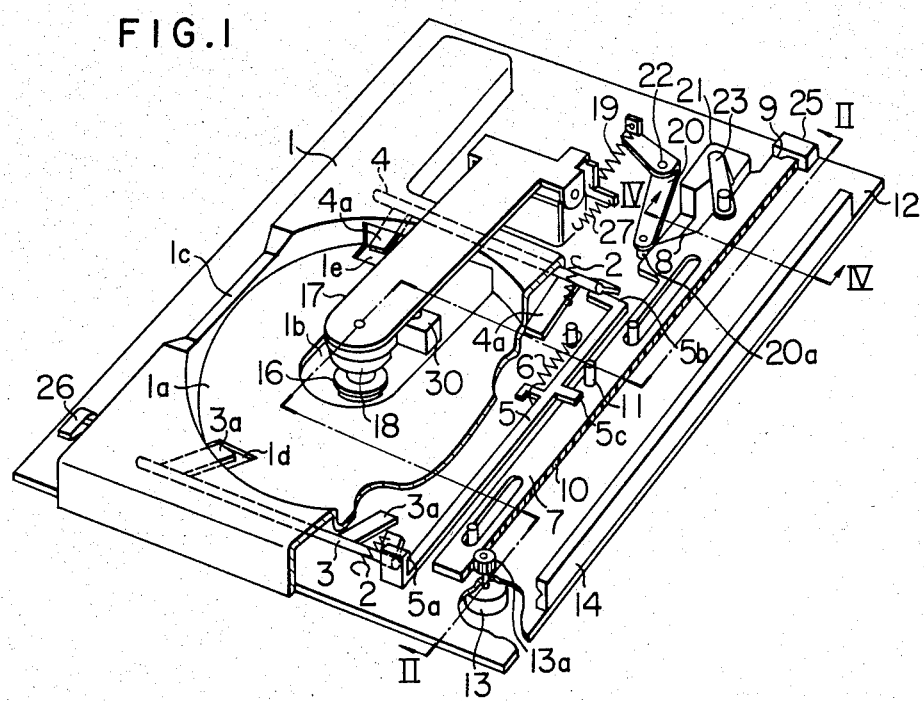
FIG. 1 is a perspective view of a device for mounting an information carrying disc member according to an embodiment of the present invention, showing a state wherein the carrying disc member is mounted.
Figure 2:
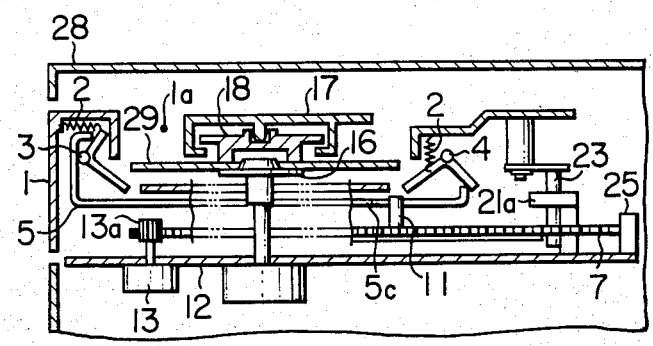
FIG. 2 is a sectional view taken along the line II—II of FIG. 1.
Figure 6:
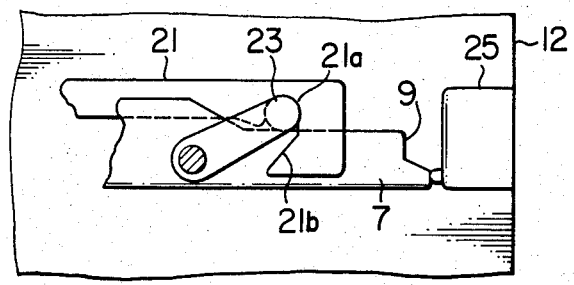

The reference numeral 1 denotes a movable base, which has at its center a recessed portion 1a having a diameter slightly larger than the outer diameter of an information carrying disc member, and a hole 1b having a diameter larger than the diameter of a turntable and located at the center of the recessed portion 1a, and at both its sides, respectively, recessed portions 1c extending from its side surfaces to the recessed portion 1a. A lever 3, a lever 4, and a link 5 are attached to a back face of the movable base 1. The lever 3 is located at the forward side of the recessed portion 1a and its portions 3a and 3b opposing the carrying disc member are urged upwards by means of an up spring 2 through the holes 1d formed in the recessed portion 1a. On the other hand, the lever 4 is located at the backward side of the recessed portion 1a and its portions 4a and 4b opposing the information carrying disc member are urged upwards by means of an upspring 2 through the holes 1e formed in the recessed portion 1a. The link 5 is extended along the side surface of the recessed portion 1a so as to oppose the levers 3 and 4 and is made slidable. The link 5, normally, causes the levers 3 and 4 to be rocked with the use of its portions 5a and 5b opposing the levers 3 and 4, by being urged by a spring 6, thereby causing the opposing portions 3a and 4a to be located at positions lower than the positions of the holes 1d and 1e. A rack 7 is mounted on the movable base 1 in parallel with the link 5 so that it may be slidable in the to-and-fro direction. The rack 7 has a cam portion 8 at the left side surface of its backward portion and an end portion 9 of its most backward position. further, the rack 7 has a tooth portion 10 at its right side surface. Further, the rack 7 has at its center a convexed portion 11 allowed to oppose a projection 5c of the link 5. The tooth portion 10 of the rack 7 is disposed at the position at which it can be meshed with a gear portion 13a fixed to a feed motor 13 mounted on a chassis 12. The reference numeral 14 denotes guide rails, and the reference numeral 15 denotes cross rollers disposed between the side surfaces of the movable base 1 and the surfaces, opposite thereto, of the corresponding guide rails, said cross rollers being disposed so as to cause the movable base 1 to slide in the to-and-fro direction with respect to the chassis 12. The reference numeral 16 denotes a turn table disposed in the recessed portion 1a through the hole 1b of the movable base 1. The reference numeral 17 denotes a clamper arm, which rotatably supports a clamper 18 at its tip end. The clamper arm 17 is attached, at its rear end, to one end of a link 20 through a pressure spring 19. The link 20 is attached onto a support shaft 22 fixed onto the chassis 12 in such a manner that it can be rockable about the support shaft 22. A pin 20a attached onto the underside of the other end of the link 20 abuts against a cam portion 8 of the rack 7. The reference numeral 21 denotes a latch guide fixed to the chassis 12 at the backward position of the rack 7, said latch guide having a cam portion 21a and an opposing portion 21b which is provided continuously to the cam portion 21a. The opposing portion 21b is disposed in the path of movement of the rack 7 and opposes the latch 23 rockably mounted on the movable base 1 and engaged with the end portion 9 of the rack 7. When the rack 7 is moved rearwards, i.e., rightwardly of FIG. 5, the latch 23 is allowed to abut against the opposing portion 21b of the latch guide 21 and, at the time of subsequent rearward movement of the rack 7, is rocked and disengaged from the end portion 9 of the rack 7. Thus, the latch 23 is carried into the cam portion 21a and retained thereby as shown in FIG. 6. The reference numeral 25 denotes a close switch, which is opened and closed by the end portion 9 of the rack 7. In FIG. 1, the reference numeral 26 is an open switch, which is so disposed as to be opened and closed by the movable base 1 and is mounted on the chassis 12. The reference numeral 27 denotes an up spring, which normally urges the clamper arm 17 upwards. The reference numeral 28, which appears in FIG. 2, denotes a case, which covers the chassis 12. The reference numeral 29 is an information carrying disc member. In FIG. 1, 30 denotes a pickup for reading the information recorded in the information carrying disc member 29. It is to be noted here that the turn table 16 is connected to a drive motor and is driven by a driving circuit (which is not shown since having no direct relevance to the present invention). The feed motor 13, close switch 25, open switch 26 and pickup 30 are also connected to the drive circuit.

Figure 3:
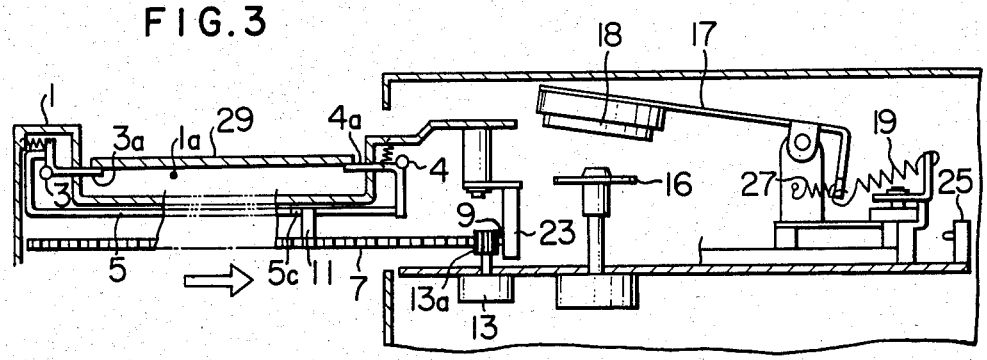
FIG. 3 is a sectional view taken along the line II—II of FIG. 1, which is a view when a movable base has been moved forwards.
Figure 4:
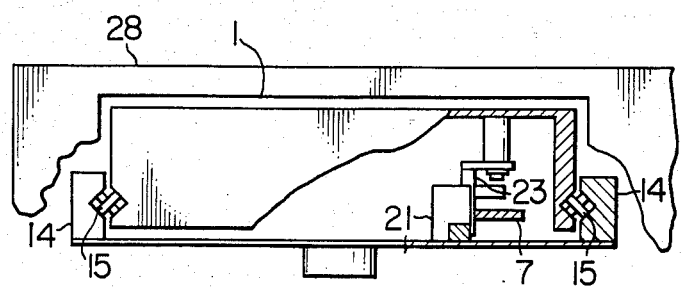
FIG. 4 is a front view, partly in section, of the device taken along the line IV—IV of FIG. 1; and, FIGS. 5 and 6 are plan views, partly enlarged, of different states of the device, which are intended to explain the operations of the device.
Figure 5:
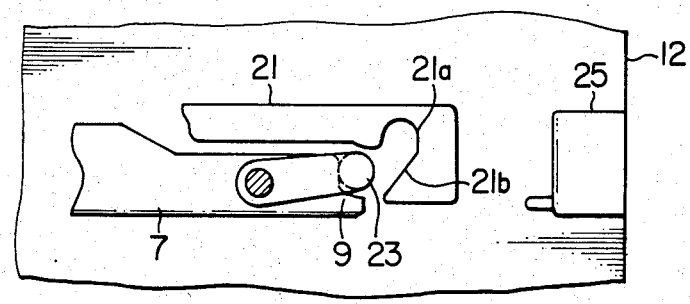

The operation of the device for mounting an information carrying disc member, having the foregoing construction will now be described. FIG. 3 shows a state wherein the movable base 1 is moved forwards. At this time, since the projection 11 of the rack 7 pushes the projection 5c of the link 5 forwards, i.e., leftwardly of the illustration, the levers 3 and 4 are respectively rocked by means of the up springs 2, the opposing portions 3a and 4a are allowed to project into the interior of the recessed portion 1a of the movable base 1. Further, the latch 23 is engaged with the end portion 9 of the rack 7. Further, the clamper arm 17 raises the clamper 18 upwardly from the turn table 16 by the action of the up spring 27. When, in this state, the information carrying disc member 29 is placed on the opposing portions 3a of the lever 3 and also on the opposing portions 4a of the lever 4 and a close button (not shown) is operated, then the feed motor 13 is allowed to rotate by the operation of the driving circuit, whereby the rack 7 is conveyed in a direction indicated by the arrow of FIG. 3. At this time, since the end portion 9 of the rack 7 pushes the latch 23 rearwards, the movable base 1 starts to move in the direction indicated by the arrow. When the latch 23 is brought into abutting engagement with the opposing portions 21b of the latch guide 21, the latch 23 is compulsively rocked into the cam portion 21a, whereby it is disengaged from the end portion 9 of the rack 7 as shown in FIG. 6, whereby the movable base 1 ceases to move and is brought to a state wherein it is retained. Since, however, the rack 7 continues to move further, the projection 11 pushing the link 5 is disengaged from the link 5, which is then moved by the tension spring 6, thereby compulsively lowering the opposing portions 3a of the lever 3 and the opposing portions 4a of the lever 4. At this time, the information carrying disc member 29 is allowed to fall onto the turn table 16. Since the rack 7 is further moved whereby the cam portion 8 pushes the pin 20a fixed on the link 20, the link 20 is rocked whereby the pressure spring 19 is expanded. Thus, the clamper arm 17 is lowered whereby the clamper 18 pushes the information carrying disc member 29 downwards and sandwiches the same together with the turn table 16 for fixing the same in place. When the rack 7 is further moved whereby the close switch 25 is pushed, the feed motor 13 is allowed to stop. Thus, the turn table 16 is allowed to rotate and the pickup starts to read the information. Thus, the device is brought to a state shown in FIG. 2.

Reference will now be made to the case where the information carrying disc member 29 is taken out, or dismounted. When the open switch (not shown) is pushed from the state shown in FIG. 2, the feed motor 13 is reversely rotated by the operation of the driving circuit, whereby the rack 7 is moved forwards. At this time, the movable base 1 is kept in a state wherein the latch 23 is carried into the cam portion 21a. As the rack 7 is moved forwards, the cam portion 8 is disengaged from the pin 20a of the link 20. For this reason, the clamper arm 17 is raised by the action of the up spring 27 and thus the clamper 18 is separated from the information carrying disc member 29. Next, the convexed portion 11 pushes the projection 5c of the link 5 against the action of the tension spring 6, whereby the levers 3 and 4 are rocked by the action of the up spring 2, whereby their opposing portions 3a and 4a are allowed to rise. Thus, the disc member 29 is separated from the turn table 16. Next, the latch 23 is rocked from the cam portion 21a to the end portion 9 of the rack 7 by going along the configuration of the opposing portion 21b, and is engaged with the end portion 9 by the action of the tension spring 6 (the state shown in FIG. 5). At this time, the movable base 1 starts to move forward. When the movable base 1 continues to move further and the open switch 26 is pushed by the convexed portion of the movable base 1, the rotation of the feed motor 13 is stopped whereby the movable base 1 is also stopped (the state shown in FIG. 3). At this time, it is possible to take out the information carrying disc member 29.

According to this embodiment, since the movement and retention of the movable base can be reliably effected merely by the movement of the rack only in one direction and can be controlled by a single feed motor, provision of a motor for retaining the movable base is unnecessary. This makes it possible to reduce costs and save space. Further, since, according to this embodiment, the stoppage and retention of the movable base 1 can be concurrently effected by an intermeshing of the latch and the latch guide, the number of necessary parts is reduced and the position adjustment becomes unnecessary.

Since, according to the present invention, the conveying mechanism for conveying the movable base having the information carrying disc member placed thereon and the clamper mechanism can be controlled by the movement of the rack, the use of a single motor can sufficiently serve the purpose. This brings about the effect of achieving the simplification of the structure and the reduction of the space required.

What is claimed is:

1. A device for mounting an information carrying disc member comprising:
   a chassis having a front portion and a rear portion;
   a movable base having a recessed portion with a diameter slightly larger than the diameter of said information carrying disc member, and being mounted movable on said chassis so that said base may be movable from the front portion to the rear portion of the chassis;

a disc-member raising and lowering means for raising and lowering said information carrying disc member within said recessed portion;

a motor mounted on said chassis;

a rack mounted movably on said movable base so that said rack may be moved from the front portion to the rear portion of said chassis, and being driven by said motor so that said rack may move said movable base from the front portion to the rear portion of the chassis;

a latch mounted movable on said movable base, and engaged with an end portion of said rack, said latch being mounted rockably on said movable base so as to rock in a direction away from said end portion of said rack when said latch abuts against said latch guide;

a latch guide mounted on said chassis and adapted to abut against said latch so as to disengage said latch from said rack when said information carrying disc member is moved up to a position adjacent a turntable in response to movement of said rack, thereby terminating movement of only said movable base;

linkage means for lowering said information carrying disc member onto said turntable in response to the termination of the movement of said movable base;

a clamper arm disposed adjacent to said turntable and rotatably supporting a clamper arranged to face said turntable, said clamper being supported at a raised position at which said clamper is spaced apart from said turntable; and a control means for lowering said clamper arm in relationship with further movement of said rack, thereby causing said information carrying disc member to be urged against said turntable by said clamper and fixedly held in place thereon.

2. A device according to claim 1, wherein said control means includes a link rotatably supported on said chassis, a spring mounted between said clamper arm and a first end of said link, and wherein said rack has a cam portion provided on a portion thereof facing a second end of said link, whereby said clamper arm is lowered through said spring by rocking said link by said cam portion during movement of said rack.

3. A device for mounting an information carrying disc member comprising:

a chassis having a front portion and a rear portion;

a movable base having a recessed portion with a diameter slightly larger than the diameter of said information carrying disc member, and being mounted movable on said chassis so that said base may be movable from the front portion to the rear portion of the chassis;

a disc-member raising and lowering means for raising and lowering said information carrying disc member within said recessed portion;

a motor mounted on said chassis;

a rack mounted movably on said movable base so that said rack may be moved from the front portion to the rear portion of said chassis, and being driven by said motor so that said rack may move said movable base from the front portion to the rear portion of the chassis;

a latch mounted movable on said movable base, and engaged with an end portion of said rack;

a latch guide mounted on said chassis, and adapted to abut against said latch so as to disengage said latch form said rack when said information carrying disc member is moved up to a position adjacent a turntable in response to movement of said rack, thereby terminating movement of only said movable base, said latch guide has a first portion facing said end portion of said rack and a second cam portion provided contiguously with said first portion, such that said movable base is retained by insertion of said latch into said cam portion;

linkage means for lowering said information carrying disc member onto said turntable in response to the termination of the movement of said movable base;

a clamper arm disposed adjacent to said turntable and rotatably supporting a clamper arranged to face said turntable, said clamper being supported at a raised position at which said clamper is spaced apart from said turntable; and a control means for lowering said clamper arm in relationship with further movement of said rack, thereby causing said information carrying disc member to be urged against said turntable by said clamper and fixedly held in place thereon.

* * * * *